United States Patent [19]
Rees

[11] 4,143,193
[45] Mar. 6, 1979

[54] MOLDED CONTAINER

[75] Inventor: Robert L. Rees, Bartlesville, Okla.

[73] Assignee: Phillips Petroleum Company, Bartlesville, Okla.

[21] Appl. No.: 721,647

[22] Filed: Sep. 8, 1976

[51] Int. Cl.² .................. B32B 1/02; B32B 27/00
[52] U.S. Cl. .......................... 428/35; 264/271; 264/275; 264/310; 280/5 A; 428/138; 428/188
[58] Field of Search ............. 428/188, 911, 35, 138; 264/310, 311, 271, 275; 280/5 A; 220/9 A, 13, 63 A

[56] References Cited
U.S. PATENT DOCUMENTS

| 2,406,903 | 9/1946 | Rethorst | 220/63 A |
| 3,364,292 | 1/1968 | Lemelson | 264/310 |
| 3,417,097 | 12/1968 | Downing et al. | 264/310 |
| 3,634,578 | 1/1972 | Suzuki | 264/275 |
| 3,912,107 | 10/1975 | Baumann | 220/9 A |

Primary Examiner—George F. Lesmes
Assistant Examiner—P. Thibodeau

[57] ABSTRACT

A container is made by attaching an inner member to a rotational mold, extending across the interior of the mold and terminating near the interior surface, and forming a container in the mold by rotational molding.

17 Claims, 7 Drawing Figures

MOLDED CONTAINER

BACKGROUND OF THE INVENTION

This invention relates to a rotationally molded article comprising an inner member extending across the inner space of the article. In one aspect the invention relates to a method of rotationally molding an article.

Baffles with openings therethrough are used in containers such as vehicle fuel tanks to dampen the forces of surging liquid during sudden stops. Without the dampening effect of baffles, it is sometimes possible for such surges to apply sufficient force to overload a tank thus increasing the danger of rupture and loss of liquid or vapor therefrom with the resulting danger of fire or release or dangerous fumes.

The installation of baffles in one piece molded plastic tanks is quite difficult. It is impossible, of course, to install such baffles after forming the tank. If baffles are formed by molding a wall of the container around a tapered rib on the wall of the mold thus forming a hollow inwardly extending protrusion, several problems combine to cause difficulty in molding. The inwardly extending protrusion is necessarily double walled wasting valuable space. The wall of the container generally is thinner at the top of such a tapered rib and thus is the weakest portion of the container and the remainder of the container must be made heavier than desirable in order to provide the necessary strength at the weak point which also increases the cost of the container due to the large amount of resin required. Such protrusions often cause mold release problems. For these reasons in most instances there is a practical limitation on such a protrusion to limit it to a height of about ¼ to ⅓ of that of the container.

Where the container is very shallow it is possible to extend such a protrusion entirely through the container but even in this instance the difficulties of thinning of the container wall, difficult mold release and loss of tank volume remain.

An object of the invention is to provide baffles in rotational molded containers without the hollow protrusions of the prior art. Another object of the invention is to rotationally mold containers having internal baffles without producing unnecessary thinning of the container walls, unusual mold release problems and without unnecessarily losing tank volume. Another object of the invention is to rotationally mold containers having rigidly supported internal baffles with a minimum use of resin.

According to the invention a rotationally molded article is produced having a member extending across the interior space thereof, the inner member being attached at one location by support means molded into the wall of the article and at another location by engagement with an inner portion of the wall.

Figure 1:
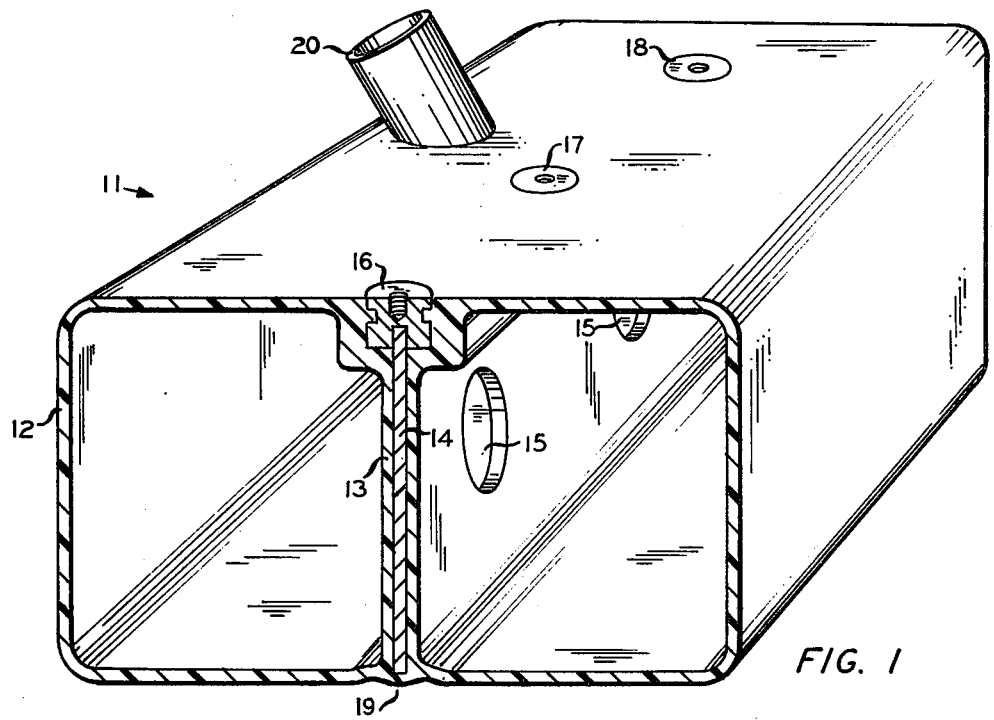
FIG. 1 illustrates a rotationally molded tank partially cut away to show an inner baffle extending across the interior.

Referring to FIG. 1, tank 11 comprises an outer wall 12 and a baffle 13 extending across the interior thereof. Baffle 13 comprises a metal plate 14, with openings 15, held in place by support means 16, 17 and 18 at one location along one side thereof and engaging wall 12 at another location along the other side thereof.

As can be seen in FIG. 1, support means 16, 17 and 18 are surrounded by a part of the resin which forms tank 11, and that plate 14 is substantially coated with this resin. Where the baffle engages the opposite side of tank 11 it has become embedded within the resin forming tank 11 during the molding process. Tank 11 has become slightly distorted at 19 during the cooling process.

Other fittings and accessories can be incorporated into the tank as desired, such as filler neck 20 as well as other items not shown including gauge fittings, mounting hardware, other inlet and/or outlet openings, etc.

Figure 4:
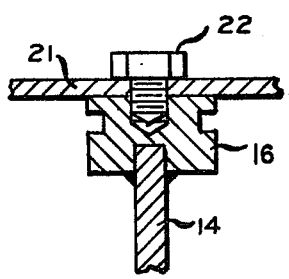
FIGS. 4 and 5 illustrate one embodiment of a baffle attaching member before and after molding.

In making tank 11, support means 16, 17 and 18 are attached to wall 21 of the mold by bolts 22 as illustrated in FIG. 4. Metal plate 14 is attached to each of the support means as by welding, brazing soldering, riveting, etc. Plate 14 extends across the interior of the mold and stops a short distance short of the wall opposite wall 21. Preferably plate 14 is spaced sufficiently from the vertical sides of the mold to permit the resin to flow freely to form the tank without attaching the ends of the baffle to the tank. After plate 14 is in place, the mold is then provided with the necessary molding powder and heated and rotated in the normal manner for rotational molding, thus forming tank 11.

Figure 5:
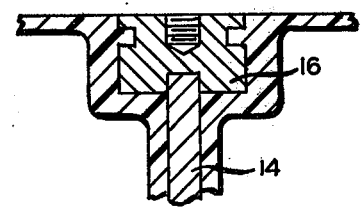

By reference to FIG. 5 it will be seen that the resin which forms tank 11 has surrounded plate 14 and support means 16 except on the mold surface side of support 16. Along its opposite edge plate 14 has become attached to tank 11 as illustrated in FIG. 1. By removing bolts 22 and opening the mold in the usual manner tank 11 is released from the mold.

Figure 6:
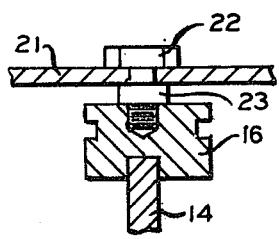
FIGS. 6 and 7 illustrate another type of baffle attaching member before and after molding.
Figure 7:
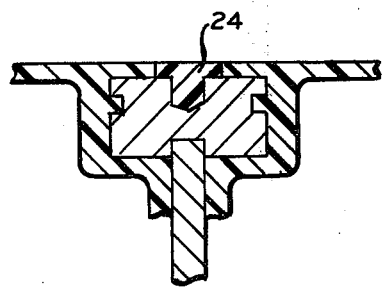

FIGS. 6 and 7 illustrate a modification in which support means 16 is spaced from wall 21 by a spacer 23. It will be seen that, upon removal of the mold, support means 16 is covered on its upper edge by the outer wall of the molded tank with the exception of an opening representing the space filled by bolt 22 and spacer 23 during the molding operation and which, after molding, can be filled with a plug 24 which can be preformed and cemented or welded in place or can be cast in place.

Figure 2:
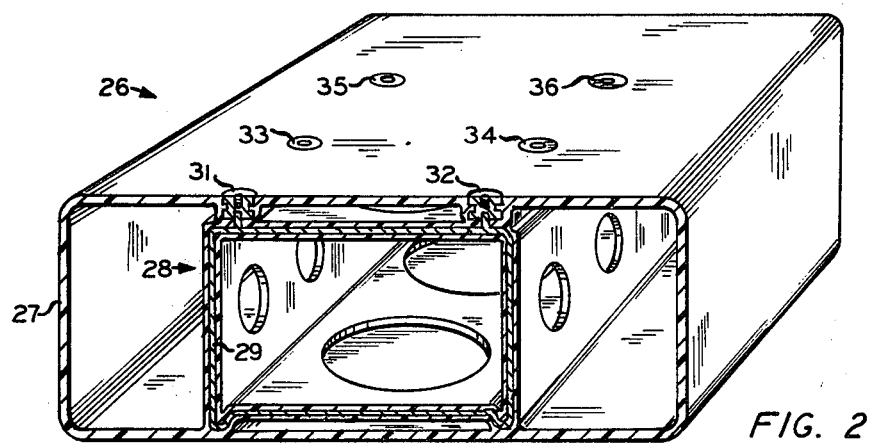
FIG. 2 illustrates a tank with a portion cut away to show a baffle cage.

In FIG. 2 tank 26 comprises an outer wall 27 and a baffle cage 28 comprising a metal cage member 29 supported at its upper side by support means 31, 32, 33, 34, 35 and 36 and engaged by wall 27 at its lower extremities.

Figure 3:
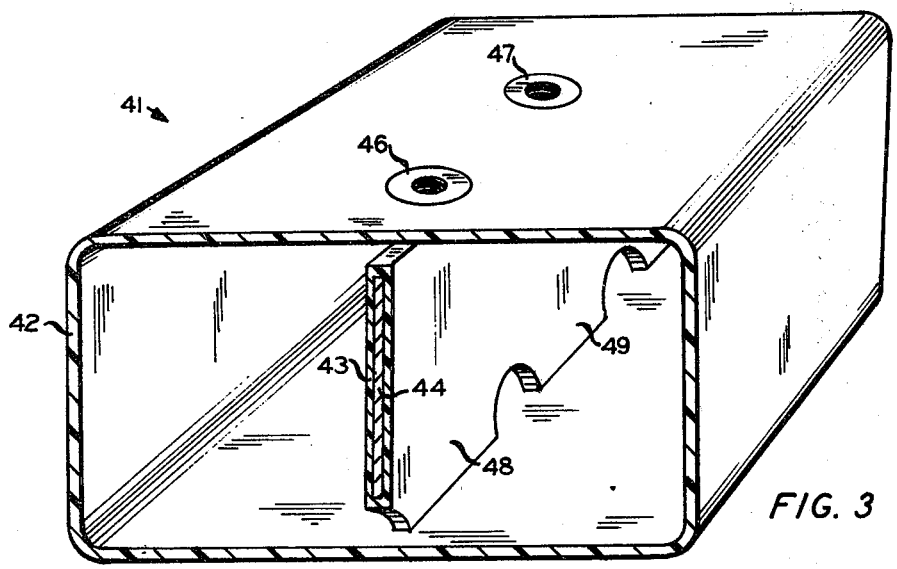
FIG. 3 illustrates another embodiment of a rotationally molded tank with a portion cut away to show a baffle extending across the interior thereof.

FIG. 3 illustrates a tank 41 comprising an outer wall 42 and baffle 43. Baffle 43 comprises a metal plate 44 which is attached to outer wall 42 by supporting means 46 and 47 on one side and by engagement with the wall of container 42 at the opposite side by feet portions 48 and 49.

As is the case with the embodiment illustrated in FIG. 1, the tanks of FIG. 2 and FIG. 3 have their baffles and supporting means substantially enclosed by a coating of the molding resin.

In all of the embodiments often it is desirable to preheat the plate forming the core of the baffle prior to beginning the molding operation. The heat supplied to the mold during the molding operation usually is sufficient to keep the plate warm enough to encourage complete coverage by the molding resin. Where coating of the baffle plate is not necessary or desirable it may be preferable to leave it unheated thus minimizing coating thereof. By properly spacing the baffle from the mold the baffle can be firmly attached even though it is not coated or only incompletely coated. It is desirable after molding that the baffle be firmly attached to two opposite sides of the tank or container, preferably the bottom and the top, while the ends of the baffle remain clear of the two remaining sides permitting flow of the resin during molding and controlled passage of the fluid contents during use.

Usually the baffles are attached to metal inserts forming the support means in the top or vapor phase of the containers. In this way the baffles are securely anchored to one side of the container where it is not expected that leakage would occur. The baffle plates are sized to allow for any shrinkage of the molded part thus allowing the resin to flow under the plate during the molding step so that a complete wall is molded. If desired, the bottom of the mold can have a raised ridge on each side of the baffle but spaced apart therefrom to permit a builup of the resin along the bottom of the baffle or it can have a plurality of posts on each side of the baffle which become covered with resin extending to the baffle for rigid support.

The rotationally molded article can be made from any one of a plurality of materials such as high density polyethylene, a crosslinkable polyethylene, nylon, and the like.

Presently preferred crosslinkable thermoplastic polymers comprise homopolymers, copolymers, or mixtures thereof, that are derived from polymerization of 1-monoolefins having from 2 to 8 carbon atoms. Particularly preferred thermoplastic polymer compositions are selected from homopolymers of ethylene or copolymers of ethylene with minor amounts of other monomers copolymerizable therewith, for example the mono-1-olefins having 3 to 8 carbon atoms such as propylene, butene-1, hexene-1, octene-1, and the like. An especially preferred class of thermoplastic polymers employed are homopolymers and copolymers of ethylene having a density (grams/cc) within the range of from about 0.940 to about 0.970 as determined by ASTM D 1505-68, a melt index of at least about 10, preferably at least about 15 and even more preferably at least about 25 or greater as determined by ASTM 1238-70, a vicat softening temperature of about 240° F. (115° C.) to about 260° F. (127° C.), preferably within a range of from about 255° F. (124° C.) to about 260° F. (127° C.) as determined by ASTM D 1525-70, and a melt temperature range of from about 270° F. (132° C.) to about 290° F. (143° C.), preferably from about 280° F. (138° C.) to about 285° F. (141° C.) as determined by ASTM D 2117-64.

The crosslinkable thermoplastic polymer composition employed in the practice of this invention contains a suitable crosslinking agent. Any peroxy compound which under first shape molding conditions provides a crosslinked thermoplastic polymer can be employed. Particularly preferred crosslinking agents are acetylenic diperoxy compounds which have molecular weight within the range of from about 230 to about 550 that can be represented by the formula

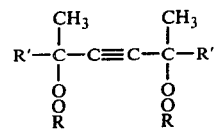

wherein each R is independently selected from the group consisting of tertiary alkyl, alkyloxycarbonyl and benzoyl radicals, and each R' is independently selected from methyl and ethyl radicals. Illustrative of suitable peroxy compounds are the following specific chemicals: 2,7-dimethyl-2,7-di(t-butylperoxy)octadiyne-3,5; 3,6-dimethyl-3,6(t-butylperoxy)octyne-4; 2,5-dimethyl-2,5-di(peroxy-n-propyl carbonate)hexyne-3; 2,5-dimethyl-2,5-di(alphacumylperoxy)hexyne-3; 2,5-dimethyl-2,5-di(peroxy beta-chloroethyl carbonate)hexyne-3; and 2,5-dimethyl-2,5-di(t-butylperoxy)hexyne-3. The amount of crosslinking agent employed can vary widely but of course should be a quantity which effectively causes crosslinking of the polymer at the desired molding temperatures. Generally the peroxide compound is employed in combination with the thermoplastic materials in amounts within the range of from 0.1 to 10.0 parts, preferably from 0.25 to 2.5 parts, and more preferably from 0.50 to 1.0 part per 100 parts by weight of thermoplastic polymer.

It often is desirable to provide ribbed areas such as the undercut portion of support means 16 as illustrated in FIGS. 4, 5, 6 and 7 to hold the baffle plate securely in place and prevent movement thereof.

EXAMPLE

A tank mold 11" × 16" × 7½" was fitted with an aluminum baffle 3/16" thick attached to the top of the mold and sized to clear the bottom about ¼" and the ends ⅜". The baffle was preheated to 600° F. (315° C.) and attached to the wall of the mold in the manner shown in FIG. 4. The mold was charged with 4 lbs. of a crosslinkable high density polyethylene powder containing 0.5 percent carbon black by weight. The mold was attached to the arm of a McNeil-Akron Roto Cast rotational molding machine and transferred to the oven operating at 600° F. (315° C.) where it was rotated on one axis at 8 RPM and simultaneously on a second axis at 9 RPM for 14 minutes. The mold was then transferred to the cooling section of the machine where it was subjected to a stream of air for 3 minutes, a water fog for 7 minutes, and a tap water stream for 30 seconds. The mold was then opened and the part removed. An inspection of the part made by cutting one end off showed that the baffle was substantially coated and rigidly attached to the top and bottom in a manner illustrated by FIG. 1. The ends of the baffle cleared the ¼" sidewall by approximately ⅜".

What is claimed is:

1. A rotationally molded container comprising:
    a substantially continuous outer wall means of a synthetic resin enclosing a space; and
    an inner structure comprising at least one baffle extending across said space, engaging said wall at two locations, carried by support means molded into said wall at one of said two locations and engaging the inner portion of said wall at the other of said two locations;

said baffle being adapted to permit passage of a fluid within said container from one side of said baffle to the other.

2. The container of claim 1 wherein said wall has a plurality of inwardly directed protrusions which engage said inner structure at said one of said locations.

3. The container of claim 1 wherein said wall has an elongated inwardly directed protrusion which engages said inner structure at said other location.

4. The container of claim 1 wherein said wall has a plurality of inwardly directed protrusions at said other location.

5. The container of claim 1 wherein said baffle comprises a metallic baffle which is attached to said wall at said one of said locations and extends into engagement with said inner portion of said wall at said other of said locations.

6. The container of claim 1 wherein said inner structure comprises a plurality of said baffles, each baffle being attached to said wall at said one of said locations by support means molded into said wall and extending therethrough and at said other of said locations by engagement with an inner portion of said wall.

7. The container of claim 1 wherein said inner structure comprises a plurality of baffles connected one to the other thus forming a baffle cage, said cage being attached to said wall at said one of said locations and engaging said wall at the other of said locations.

8. The container of claim 1 wherein said support means comprises a fitting having a surface flush with the outer surface of said article and having a threaded opening therein.

9. The container of claim 1 wherein said support means comprises a fitting recessed below the outer surface of said article.

10. The container of claim 1 wherein the one side of the support means is flush with the outside wall of the container and the remainder of said support is molded into said wall.

11. The container of claim 1 wherein the support means is recessed in the wall of the container and said support is substantially completely molded into said wall.

12. Th container of claim 5 wherein the metallic baffle is coated with the resin of the container.

13. The container of claim 7 wherein the baffle cage is metallic and said baffle cage is coated with the resin of the container.

14. A rotationally molded container comprising:
a substantially continuous outer wall means of a synthetic resin enclosing a space; and
an inner structure comprising a metallic baffle extending across said space, engaging said wall at two opposing locations, carried by support means molded into said wall at one of said two locations and engaging the inner portion of said wall at the other of said two locations;
said baffle having openings therethrough to permit passage of a fluid within said container from one side of said baffle to the other.

15. A method for making a molded container having a substantially continuous outer wall enclosing a space, comprising the steps of:
attaching at least one baffle carried by a support means to the inner wall of one side of a rotational mold by removable attachment means extending through said one side of said mold and into said support means;
said baffle extending across said mold from said one side of said mold to the opposing side of said mold without attachment to said opposing side of said mold and within a distance thereof sufficient to permit free flow of the hereinafter mentioned synthetic resin between said baffle and said opposing side of said mold and to permit build-up of sufficient of said resin to engage said baffle at said opposing side of said mold during the hereinafter mentioned molding;
closing said mold;
disposing a quantity of synthetic resin within said mold;
rotating said mold in a manner to cause said resin to form said outer wall, form about said support means and engage said baffle at said opposing side of said mold by rotational molding;
removing said attachment means;
opening said mold; and
removing said container from said mold.

16. A method in accordance with claim 15 wherein the baffle is metallic and said baffle is heated prior to the closing of the mold.

17. A method in accordance with claim 15 wherein the baffle is structured to permit passage of a fluid within the container from one side of said baffle to the other after the molding step has been completed.

* * * * *